(12) United States Patent
Baba et al.

(10) Patent No.: US 9,184,509 B2
(45) Date of Patent: Nov. 10, 2015

(54) ANTENNA DEVICE AND WIRELESS COMMUNICATION APPARATUS

(75) Inventors: Junnei Baba, Fukuoka (JP); Tetsuya Ashizuka, Fukuoka (JP); Ichiro Komaki, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 295 days.

(21) Appl. No.: 13/981,906

(22) PCT Filed: Jan. 26, 2012

(86) PCT No.: PCT/JP2012/000499
§ 371 (c)(1),
(2), (4) Date: Jul. 25, 2013

(87) PCT Pub. No.: WO2012/102047
PCT Pub. Date: Aug. 2, 2012

(65) Prior Publication Data

US 2013/0307738 A1 Nov. 21, 2013
US 2014/0152515 A9 Jun. 5, 2014

(30) Foreign Application Priority Data

Jan. 26, 2011 (JP) .................. 2011-013622

(51) Int. Cl.
*H01Q 21/00* (2006.01)
*H01Q 1/24* (2006.01)
*H01Q 3/30* (2006.01)
*H04B 1/3827* (2015.01)

(52) U.S. Cl.
CPC ........... *H01Q 21/0006* (2013.01); *H01Q 1/245* (2013.01); *H01Q 3/30* (2013.01); *H04B 1/3838* (2013.01)

(58) Field of Classification Search
CPC ..... H01Q 1/245; H01Q 3/30; H01Q 21/0006; H04B 1/3838
See application file for complete search history.

(56) References Cited

U.S. PATENT DOCUMENTS 6,295,030 B1 * 9/2001 Kozakai et al. ........ 343/700 MS
7,852,272 B2 * 12/2010 Imano et al. .................. 343/702
(Continued)

FOREIGN PATENT DOCUMENTS

JP 2002-152115 A 5/2002
JP 2006-050324 A 2/2006
(Continued)

OTHER PUBLICATIONS

International Search Report, dated Apr. 17, 2012, for corresponding International application No. PCT/JP2012/000499, 4 pages.
(Continued)

*Primary Examiner* — Trinh Dinh
(74) *Attorney, Agent, or Firm* — Seed IP Law Group PLLC

(57) ABSTRACT

The antenna device includes a first antenna 11 that includes a first ground terminal 12; a second antenna 18 that includes a second ground terminal 20; a ground conductor 28 to which the first antenna 11 is connected through the first ground terminal 12 and the second antenna 18 is connected through the second ground terminal 20; and a phase shifter 24 that controls a phase difference between a first current ie1 and a second current ie2. The phase shifter 24 controls the phase difference between the first current ie1 and the second current ie2 so that the first current ie1 and the second current ie2 have components to cancel each other.

20 Claims, 13 Drawing Sheets

(56) References Cited

U.S. PATENT DOCUMENTS

2002/0058483 A1    5/2002    Shinichi et al.
2007/0210970 A1    9/2007    Egawa et al.

FOREIGN PATENT DOCUMENTS

| | | |
|---|---|---|
| JP | 2008-072486 A | 3/2008 |
| JP | 2010-187336 A | 8/2010 |

OTHER PUBLICATIONS

Nebiya et al., "Antenna Design in Ubiquitous Days Leading-Edge Technologies for Wide Band, Multi-Band, and Close Range Communications," Tokyo Denki University, 2005, 7 pages.

* cited by examiner

ANTENNA DEVICE AND WIRELESS COMMUNICATION APPARATUS

TECHNICAL FIELD

The present invention relates to an antenna device and a wireless communication apparatus that are capable of reducing, in particular, a specific absorption rate (SAR), in a portable wireless terminal such as a mobile phone, in a head part of a human body, or the influence of an electromagnetic field on a hearing aid.

BACKGROUND ART in the related art, a monopole antenna having a small size and a simple structure has been widely used as an antenna device of a mobile phone (refer to NPL 1). Hereinafter, an antenna device of a mobile phone that is mounted with the monopole antenna in the related art will be described referring to FIGS. 13(a) and 13(b).

FIGS. 13(a) and 13(b) show an antenna structure of a monopole antenna mounted to a mobile phone and electric current distribution in operation. In FIG. 13(a), a ¼λ monopole antenna 102 is mounted to a printed circuit board 101 of a mobile phone main body through a power supply point 103. In FIGS. 13(a) and 13(b), since the monopole antenna 102 resonates at a desired frequency by an antenna element and an antenna ground and forms a single antenna, a ground current ie over the printed circuit board 101 and the ground according to an antenna current ia flows in the printed circuit board 101, as shown in the figures.

In such a configuration, in terms of the size reduction for the SAR or the electromagnetic wave interference to the hearing aid, the antenna structure shown in FIGS. 13(a) and 13(b) has the following problem. In the ¼ monopole antenna, since the printed circuit board 101 of the mobile phone main body forms the ground, the ground current ie flows in the printed circuit board 101. The ground current intensively flows in the vicinity of the power supply point 103, but the portion where the electric current intensively flows is a portion where a head part is closest to a portion where a speaker 104 is installed. Thus, in the mobile phone mounted with the monopole antenna, it is difficult to reduce the SAR or the electromagnetic wave interference in the hearing aid.

CITATION LIST

Non Patent Literature

[NPL 1]
"Antenna design in the ubiquitous era" by Hideyuki Nebiya and Maki Ogawa, Tokyo Denki University Press, 2005 (P91)

SUMMARY OF INVENTION

Technical Problem

In order to solve the above described problem, an object of the invention is to provide an antenna device mounted in a portable wireless terminal such as a mobile phone and a wireless communication apparatus, capable of reducing electromagnetic field strength in the vicinity of a head part of a human body.

Solution to Problem

In order to solve the above described problem, according to an aspect of the invention, there is provided an antenna device including: a first ground antenna and a second ground antenna that are operated at the same frequency; a power distributor to which the first ground antenna and the second ground antenna are connected; a phase shifter that is inserted between the first ground antenna and the second ground antenna; and a transceiver circuit that is connected to the power distributor.

If an antenna current flows in the first ground antenna, a corresponding ground current flows in a printed circuit board, and if an antenna current flows in the second ground antenna, a corresponding ground current flows in the printed circuit board. By adjusting a distribution ratio in the power distributor and a phase rotation amount in the phase shifter so that two ground currents have the same amplitude and a phase difference of 180° in the vicinity of a speaker, two ground currents cancel each other out, and thus, it is possible to weaken electromagnetic field strength in the vicinity of the speaker. Thus, it is possible to reduce the SAR and electromagnetic wave interference in a hearing aid.

Advantageous Effects of Invention

As described above, in the antenna device and the wireless communication apparatus according to the invention, as two ground antennas which are operated at the same frequency are used and the amplitude ratio and the phase difference of the antenna currents are adjusted so that the ground currents corresponding to the respective antenna currents cancel each other out, it is possible to weaken the electromagnetic field in the vicinity of the speaker, and to reduce the SAR and the electromagnetic influence on the hearing aid.

DESCRIPTION OF EMBODIMENTS

Figure 1:
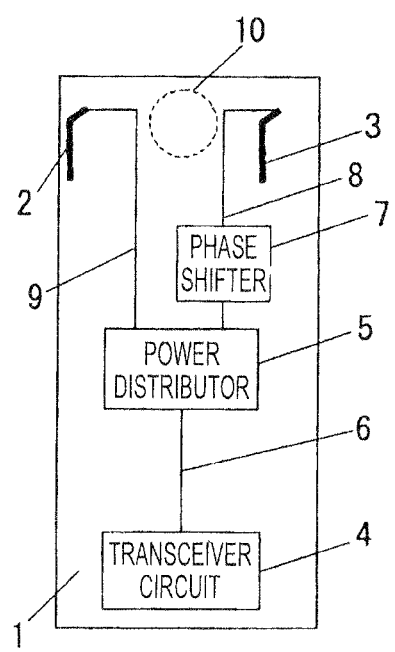
FIG. 1(a) is a general view of a board of an antenna device according to an embodiment of the invention.
FIG. 1(b) is a side view of the board.
FIG. 1(c) is a phase circuit diagram.
Figure 1:
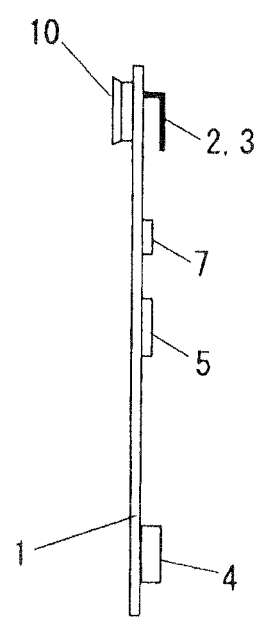
Figure 1:
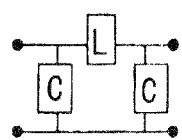
Figure 2:
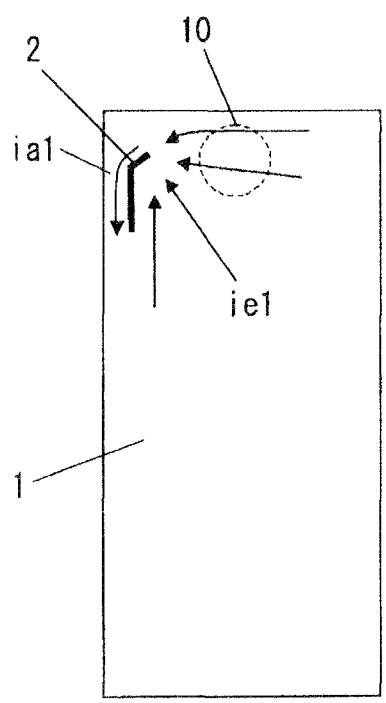
FIGS. 2(a) and 2(b) are diagrams illustrating a ground current of the antenna device according to the embodiment shown in FIGS. 1(a), 1(b), and 1(c).
Figure 2:
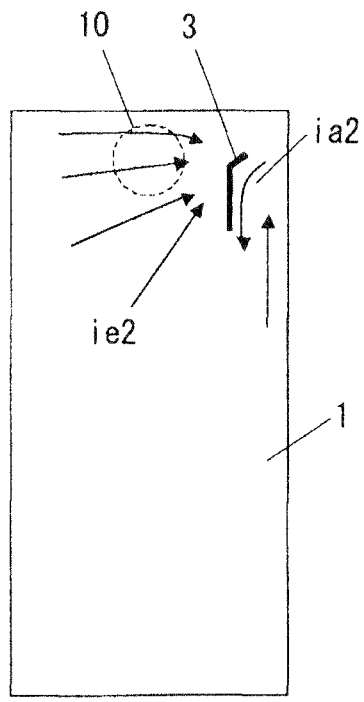
Figure 3:
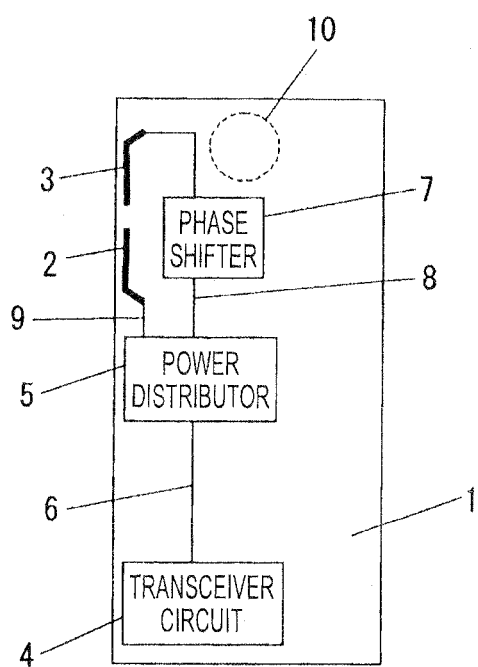
FIG. 3(a) is a general view of a board of an antenna device according to an embodiment of the invention.
FIG. 3(b) is a side view of the substrate.
Figure 3:
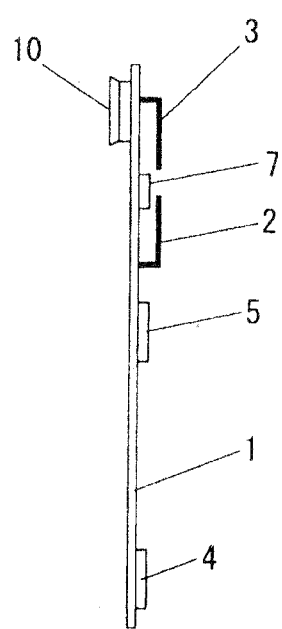
Figure 4:
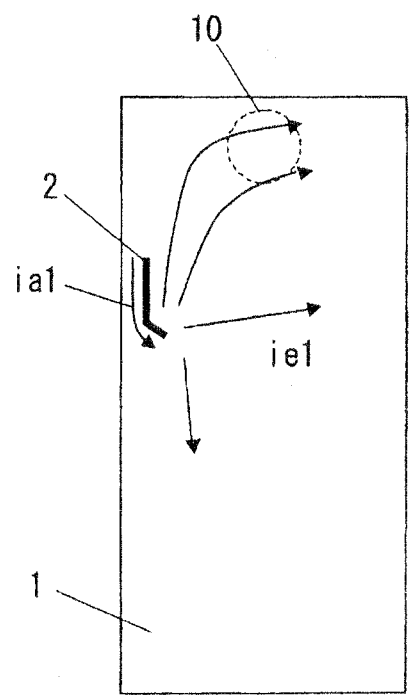
FIGS. 4(a) and 4(b) are diagrams illustrating a ground current of the antenna device according to the embodiment shown in FIGS. 3 (a) and 3 (b).
Figure 4:
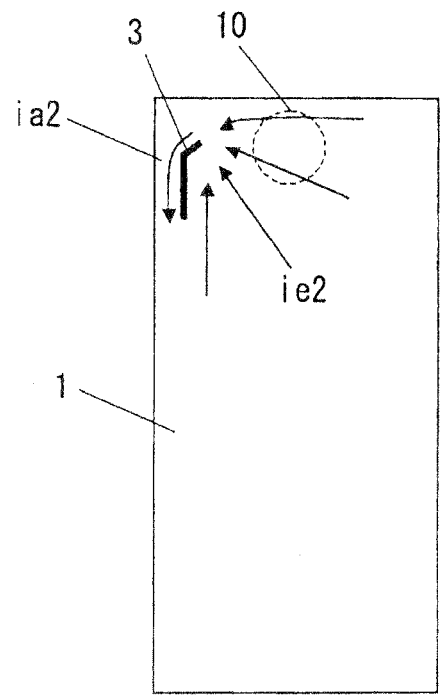
Figure 5:
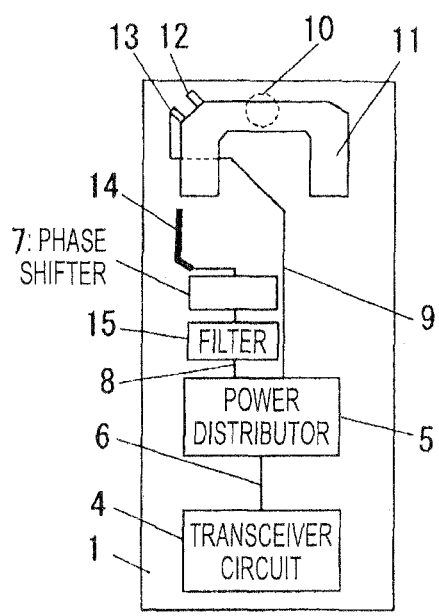
FIG. 5(a) is a general view of a board of an antenna device according to an embodiment of the invention.
FIG. 5(b) is a side view of the substrate.
FIG. 5(c) is a diagram illustrating a frequency characteristic of a filter.
Figure 5:
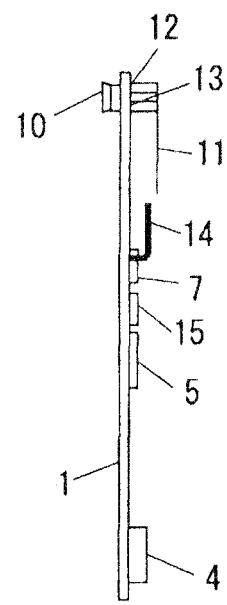
Figure 5:
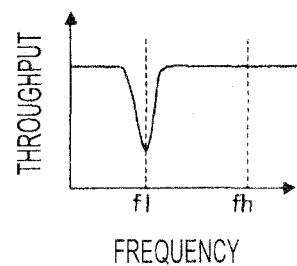
Figure 6:
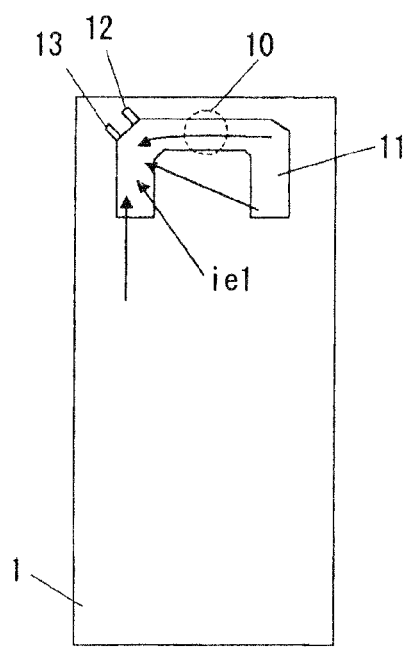
FIGS. 6(a) and 6(b) are diagrams illustrating a ground current of the antenna device according to the embodiment shown in FIGS. 5 (a), 5(b) and 5(c).
Figure 6:
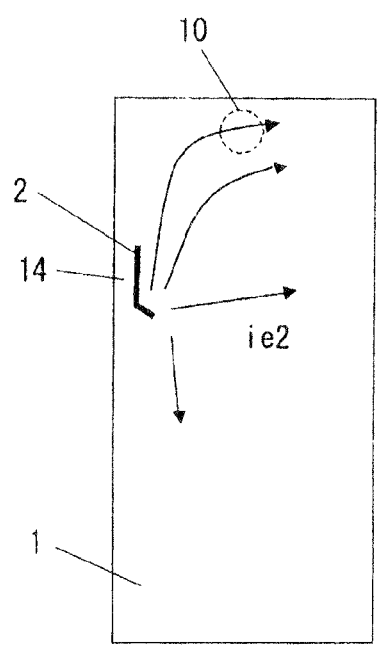
Figure 7:
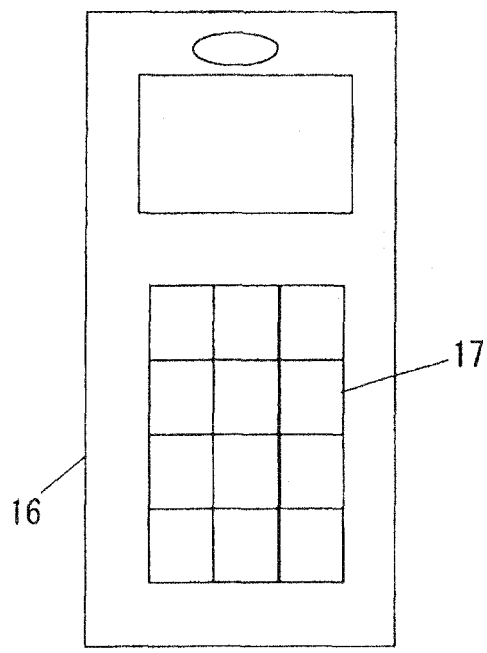
FIG. 7(a) is a front view of a casing, illustrating antenna arrangement in the antenna device according to the embodiment shown in FIGS. 5(a), 5(b) and 5(c)
FIG. 7(b) is a cross-sectional view of the casing.
Figure 7:
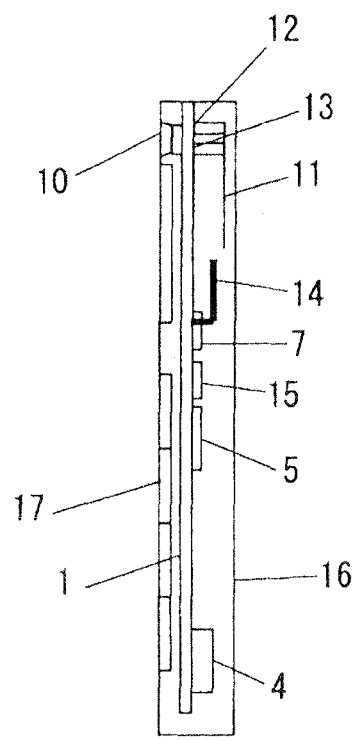
Figure 8:
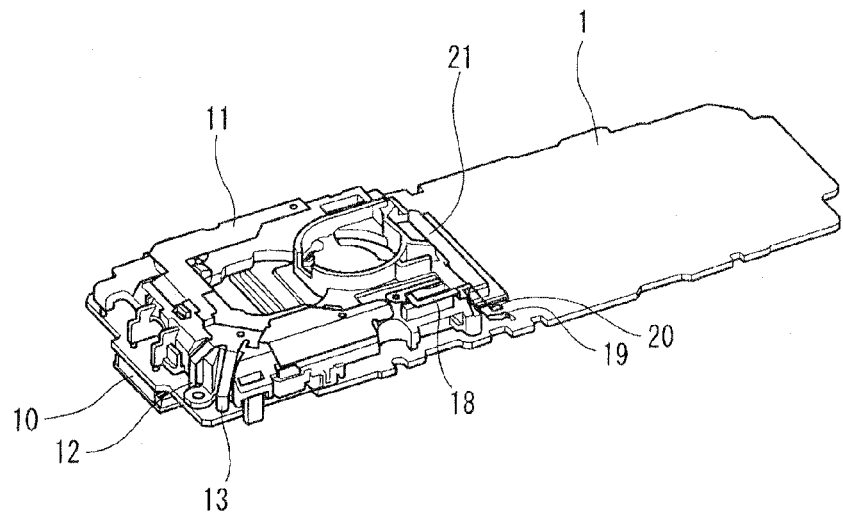
FIG. 8(a) is a perspective view of an antenna device according to an embodiment of the invention.
FIG. 8(b) is an exploded perspective view of the antenna device according to the embodiment of the invention.
Figure 8:
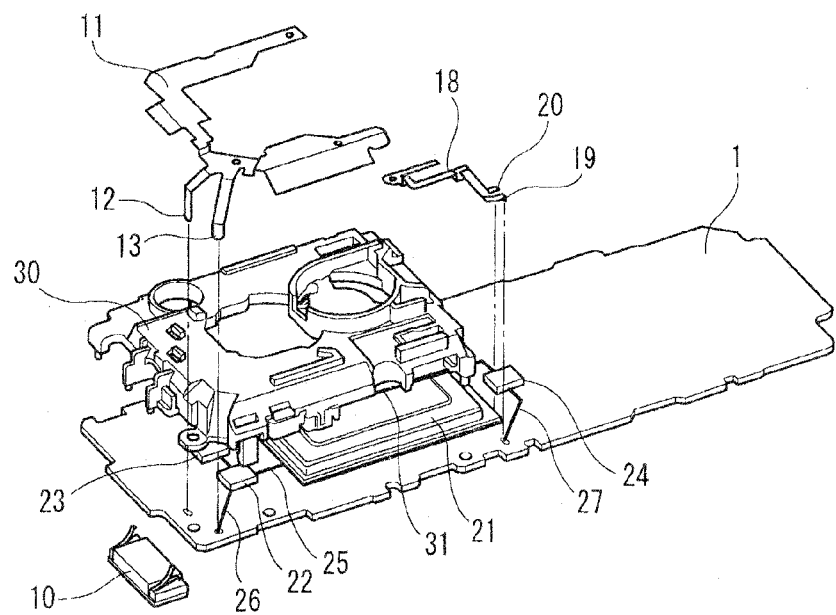

Hereinafter, embodiments of the invention will be described referring to FIGS. 1(a), 1(b), and 1(c) through FIG. 11.

First Embodiment

FIGS. 1(a) to (c) are diagrams illustrating an antenna device according to an embodiment of the invention. Reference numeral 1 in FIG. 1(a) represents a printed circuit board of a terminal main body, reference numeral 2 represents a first inverted L antenna that is provided in an upper portion of the printed circuit board 1, reference numeral 3 represents a second inverted L antenna that is provided in an upper portion of the printed circuit board 1, is operated at the same frequency as in the first inverted L antenna 2, and is laterally symmetrical in structure to the first inverted L antenna 2. The inverted L antenna has a structure in which a monopole antenna is bent in the middle thereof. The inverted L antenna 2 and the inverted L antenna 3 are installed at laterally symmetrical positions with reference to a central axis of the printed circuit board 1 having a laterally symmetrical shape. Reference numeral 4 represents a transceiver circuit provided in a lower portion of the printed circuit board 1, and reference numeral 5 represents a power distributor that equally distributes electric power transmitted from the transceiver circuit 4 to the inverted L antenna 2 and the inverted L antenna 3. Reference numeral 6 represents a micro-strip line that connects the transceiver circuit 4 and the power distributor 5. Reference numeral 7 represents a phase shifter, which is provided in the middle of a micro-strip line 8 that connects the inverted L antenna 3 and the power distributor 5. Reference numeral 9 represents a micro-strip line that connects the inverted L antenna 2 and the power distributor 5. Reference numeral 10 represents a speaker, which is installed between two inverted L antennas 2 and 3 on the approximately central axis of the printed circuit board 1, on a surface (head side of a human body) of the printed circuit board 1, opposite to the inverted L antennas 2 and 3. FIG. 1(b) is a side view of the printed circuit board 1, in which the inverted L antennas 2 and 3 are mounted to be perpendicular to the printed circuit board 1 and are bent in parallel with the printed circuit board 1 in the middle thereof. FIG. 1(c) illustrates a phase circuit that realizes the phase shifter 7, which is configured by a π circuit that uses a coil (reference numeral L in the figure) and a capacitor (reference numeral C in the figure).

In the antenna device having such a configuration, a structure capable of reducing electromagnetic field strength in the vicinity of the speaker 10 will be described referring to FIGS. 2(a) and 2(b). FIG. 2(a) is a diagram illustrating only the printed circuit board 1 and the inverted L antenna 2 in the antenna device shown in FIG. 1(a). Reference numeral ia1 represents an antenna current that flows in the inverted L antenna 2 at a specific moment, and reference numeral ie1 represents a ground current corresponding to the antenna current ia1. FIG. 2(b) is a diagram illustrating only the printed circuit board 1 and the inverted L antenna 3 in the antenna device shown in FIG. 1(a). Reference numeral ia2 represents an antenna current that flows in the inverted L antenna 3 at the same specific moment as in FIG. 2(a), and reference numeral ie2 represents a ground current corresponding to the antenna current ia2.

Since two inverted L antennas 2 and 3 are laterally symmetrical in structure and are laterally symmetrical in arrangement on the printed circuit board 1, it is possible to make amplitudes of two ground currents ie1 and ie2 equal by equally distributing the electric power by the power distributor 5, in the printed circuit board 1 having the laterally symmetrical shape.

Further, since paths of the ground currents ie1 and ie2 are nearly overlaid in the vicinity of the speaker 10 disposed between two antennas, by adjusting the phase shifter 7, it is possible to cause the antenna currents ia1 and ia2 having the same phase to flow, and to set a phase difference between the ground currents ie1 and ie2 to 180° in the vicinity of the speaker 10 disposed between two antennas. Thus, the ground currents ie1 and ie2 cancel each other out, and thus, it is possible to reduce the electromagnetic field strength in the vicinity of the speaker 10. Thus, it is possible to reduce the specific absorption rate in the head part of the human body, and to reduce electromagnetic wave interference of a hearing aid.

When the inverted L antennas 2 and 3 that are two ground antennas are arranged on the left and right sides as shown in FIG. 1(a), if the speaker 10 is disposed between two ground antennas as in the present embodiment, the paths of the respective ground currents are overlaid, and thus, the cancelling effect when the phase difference between the ground currents is set to 180° gets enhanced, which is preferred.

As the ground antenna, a linear inverted F antenna or a tabular inverted F antenna which is relatively easily adjusted may be used, instead of the inverted L antenna.

Further, as the phase circuit, a T phase circuit, a micro-strip line having a predetermined transmission path length, or a coaxial line may be used in place of the π phase circuit shown in FIG. 1(c).

Further, even though there is a difference in radiation characteristics of two antennas, if the distribution ratio in the power distributor is changed to make the amplitudes of the ground currents equal, it is similarly possible to cancel the ground currents.

Second Embodiment

FIGS. 3(a) and 3(b) are diagrams illustrating an antenna device according to an embodiment of the invention. The same reference numerals are given to the same components as in FIGS. 1(a) to 1(c). In FIG. 3(a), reference numeral 1 represents a printed circuit board of a terminal main body, reference numeral 2 represents a first inverted L antenna provided on a left edge of the printed circuit board 1, reference numeral 3 represents a second inverted L antenna that is provided on the left edge of the printed circuit board thereof so that a direction where a radiation element extends from a power supply point is opposite the first inverted L antenna, and is operated at the same frequency as that of the first inverted L antenna 2. FIG. 3(b) is a side view of the antenna device shown in FIG. 3(a).

In the antenna device having such a configuration, a structure capable of reducing the electromagnetic field strength in the vicinity of the speaker 10 will be described referring to FIGS. 4(a) and 4(b). FIG. 4(a) is a diagram illustrating the printed circuit board 1 and the inverted L antenna 2 in the antenna device shown in FIGS. 3(a) and 3(b). Reference numeral ia1 represents an antenna current that flows in the inverted L antenna 2 at a specific moment, and reference numeral ie1 represents a ground current corresponding to the antenna current ia1. FIG. 4(b) is a diagram illustrating the printed circuit board 1 and the inverted L antenna 3 in the antenna device shown in FIGS. 3(a) and 3(b). Reference numeral ia2 represents an antenna current that flows in the inverted L antenna 3 at the same specific moment as in FIG. 4(a), and reference numeral ie2 represents a ground current corresponding to the antenna current ia2. A phase difference between the ground current ie1 and the ground current ie2 is set to 180° by a phase shifter 7 in the vicinity of the speaker 10. Further, by adjusting the distribution ratio of electric power transmitted from a transceiver circuit 4 by a power distributor 5, the ground current ie1 and the ground current ie2 have the same amplitude in the vicinity of the speaker 10.

As a result, the ground current ie1 and the ground current ie2 that flow in the vicinity of the speaker 10 cancel each other out, and thus, the electromagnetic field strength is reduced. Thus, it is possible to reduce the SAR, and to reduce electromagnetic wave interference in a hearing aid.

Since the ground currents easily flow along the edge of the board, if the speaker 10 is disposed on an upper edge of the board where the ground currents of the inverted L antenna 2 and the inverted L antenna 3 are easily overlaid, and better yet in an area within 1/10 of the length of the board, the ground currents cancel each other out in the vicinity of the speaker 10, which are preferred.

As described in the first embodiment, as the ground antenna, a linear inverted F antenna or a tabular inverted F antenna that is relatively easily adjusted may be used, instead of the inverted L antenna.

The second embodiment is an embodiment in which two ground antennas are arranged on the left edge of the printed circuit board, and is efficient when an installation space of the antennas is not present on a right edge of the printed circuit board.

Third Embodiment

FIGS. 5(a), 5(b) and 5(c) are diagrams illustrating an antenna device according to an embodiment of the invention. The same reference numerals are given to the same components as in FIGS. 1(a) to 1(c).

Reference numeral 1 in FIG. 5(a) represents a printed circuit board of a terminal main body, reference numeral 11 represents a tabular F antenna provided in an upper portion of the printed circuit board 1 and is operated at two frequencies of a frequency fl and a frequency fh. Reference numeral 12 represents a ground point of the tabular inverted F antenna to the printed circuit board 1. Reference numeral 13 represents a power supply point of the tabular inverted F antenna 11. Reference numeral 14 represents an inverted L antenna that is provided on the printed circuit board 1 and is operated at the frequency fh. Reference numeral 15 represents a band-reject filter that rejects the passing of a high frequency signal of the frequency fl and passes a high frequency signal of the frequency fh. FIG. 5(b) is a side view of the printed circuit board 1, in which a speaker 10 is installed on a surface (head side) opposite to the tabular inverted F antenna 11 and the inverted L antenna 14 that is a ground antenna. FIG. 5(c) is a diagram illustrating a frequency characteristic of the band-reject filter 15, in which a signal of the frequency fl is rejected, and a signal of the frequency fh is passed.

In the antenna device having such a configuration, a structure capable of reducing the electromagnetic field strength in the vicinity of the speaker 10 will be described referring to FIGS. 6(a) and 6(b). FIG. 6(a) is a diagram illustrating the printed circuit board 1 and the inverted F antenna 11 in the antenna device shown in FIG. 5(a). Reference numeral ie1 represents a ground current at a specific moment that flows in the tabular inverted F antenna 11 at frequency fh. FIG. 6(b) is a diagram illustrating the printed circuit board 1 and the inverted L antenna 14 in the antenna device shown in FIG. 5(a). Reference numeral ie2 represents a ground current of the inverted L antenna 14 at the frequency fh, at the same specific moment as in FIG. 6(a). A phase difference between the ground current ie1 and the ground current ie2 is set to 180° by a phase shifter 7 in the vicinity of the speaker 10. Further, the distribution ratio is adjusted by a power distributor 5 so that amplitudes of the ground current ie1 and the ground current ie2 become equal.

As a result, at the frequency fh, the ground current ie1 and the ground current ie2 in the vicinity of the speaker 10 cancel each other out, and the electromagnetic field strength is reduced. Thus, it is possible to reduce the specific absorption rate in the head part of the human body, and to reduce electromagnetic wave interference of a hearing aid. Since the ground currents easily flow along the edge of the board, if the speaker 10 is disposed on an upper edge of the board where the ground currents ie1 and ie2 are easily overlaid, and preferably, in an area within 1/10 of the length of the board, the ground currents cancel each other out in the vicinity of the speaker 10, which is preferred.

At the frequency fl, a high frequency signal is supplied only to the tabular inverted F antenna 11 by the band-reject filer 15 without being supplied to the inverted L antenna 14. In this case, the ground currents do not cancel each other out in the vicinity of the speaker 10, and thus, there is no effect of reducing the SAR or electromagnetic wave interference of a hearing aid.

As described above, even in a wireless mobile terminal that is operated at plural bands, by mounting a separate antenna that is operated at a frequency band where the SAR or electromagnetic wave interference of a hearing aid is to be reduced, and by adjusting amplitudes and phase difference, it is possible to reduce the SAR or the electromagnetic wave interference of the hearing aid.

By using an antenna operated at the frequencies fl and fh in place of the inverted L antenna 14 and by removing the band-reject filter 15, it is possible to reduce the SAR or the electromagnetic wave interference of the hearing aid at the frequencies fl and fh.

In FIGS. 7(a) and 7(b), reference numeral 16 represents a casing of a mobile terminal according to the embodiment shown in FIGS. 5(a) to 5(c), and reference numeral 17 represents a keypad. In order to prevent reduction in radiation power when the terminal is held by the hand, the tabular inverted F antenna 11 and the L antenna 14 are preferably provided on an upper end side of the terminal with reference to the keypad so that the palm or fingertip does not cover the tabular inverted F antenna 11 and the inverted L antenna 14. This is similarly applied to the first embodiment and the second embodiment.

Fourth Embodiment

FIGS. 8(a) and 8(b) are diagrams illustrating an antenna device according to an embodiment of the invention, which show an antenna device mounted to a mobile phone that is usable in GSM (registered trademark). In order to show the antenna device, a casing is not shown. As an example of a wireless communication apparatus, a mobile phone mounted with an antenna device will be described later. Here, a "terminal" is an example of the wireless communication apparatus.

FIG. 8(a) shows a state where an antenna is mounted on a printed circuit board 1, and FIG. 8(b) is an exploded view of respective components. The same reference numerals are given to the same components as in FIGS. 1(a) to 1(c).

In FIGS. 8(a) and 8(b), on the rear surface of the printed circuit board 1 (on the rear surface side of the plane of the figure), a ground pattern (to be described later) is provided. On the front surface (on the front surface side of the plane of the figure) of the printed circuit board 1, a transceiver module 21 is mounted. Here, the "mounted" means that the transceiver module 21 is electrically connected to the ground pattern in a direct or indirect manner through a through-hole or a pattern of the printed circuit board, which is similarly applied to the following description. A transceiver circuit (not shown) is built-in the transceiver module 21. Specifically, the transceiver circuit includes a high frequency signal generator circuit, a modulation circuit, a demodulation circuit, a transmission signal amplification circuit, and a reception filter circuit, as main circuits.

Further, a power distributor 22, a band-reject filter 23, and a phase shifter 24 are mounted on the front surface of the printed circuit board 1. Specifically, the power distributor 22 includes a T branch circuit. Various filters may be applied to the band-reject filter 23, but here, the band-reject filter 23 includes a parallel resonant circuit of a coil and a capacitor. Particularly, the band-reject filter 23 is not limited to the configuration that employs the parallel resonant circuit of the coil and the capacitor, and a trap-type SAW filter may be employed. The phase shifter 24 sets a phase difference between ground currents that are respectively input to or output from two antennas to a predetermined angle, as described later. The power distributor 22, the band-reject filter 23 and the phase shifter 24 are respectively connected to the transceiver module 21 and the ground pattern through micro-strip lines 25, 26 and 27.

The speaker 10 is mounted on the rear surface side of the printed circuit board 1. The rear surface side of the printed circuit board 1 is an operation surface on which the speaker 10 and a keypad (not shown) are provided. Accordingly, a head part of a user who uses a mobile phone faces the rear surface side of the printed circuit board 1.

On the rear surface of the printed circuit board 1 on which the transceiver module 21, the power distributor 22 and the band-reject filter 23 are mounted, a tabular inverted F antenna 11 corresponding to a first antenna and an inverted F antenna 18 corresponding to a second antenna are further mounted. The tabular inverted F antenna 11 is operated at two frequencies of a frequency fl and a frequency fh. The frequency fl is 900 MHz, for example, and the frequency fh is 1800 MHz, for example. The inverted F antenna 18 is operated at the frequency of the frequency fh (for example, 1800 MHz).

The frequency is not limited to 900 MHz and 1800 MHz that is usable in Global System for Mobile Communications (GSM: registered trademark), and may be a band of 800 MHz or 1.9 GHz. Accordingly, the inverted F antenna 18 may be applied to a mobile phone such as Long Term Evolution (LTE) or third generation (3G). Further, the tabular inverted F antenna 11 has a shape that a radiation element is bent on the printed circuit board 1, but if there is a space in the mobile phone, it is not necessary for the radiation element to be bent. For example, a monopole antenna may be formed on an extended surface of the printed circuit board 1.

The tabular inverted F antenna 11 has a shape of "edge of stapler", in which a ground part 12 and a power supply part 13 are provided at a bent portion of an L shape. Specifically, the ground part 12 corresponds to a ground terminal. Further, specifically, the power supply part 13 corresponds to a power supply terminal. Here, the expression "edge of stapler" is used, but the shape is not particularly limited, and a U shape, an L shape or an I shape may be used as long as it represents the inverted F shape. The ground part 12 is connected to the ground pattern, and the power supply part 13 is connected to the micro-strip line 25.

Figure 9:
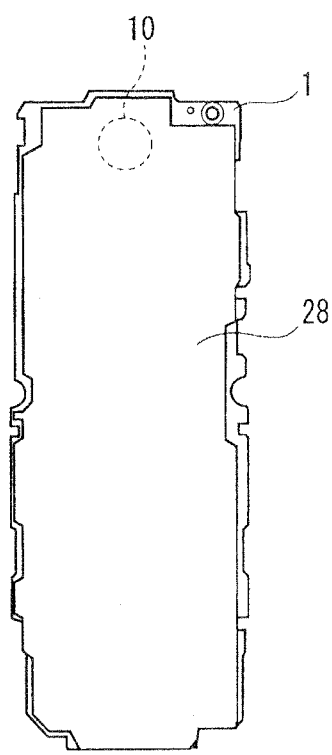
FIG. 9 is a rear view of a printed circuit board, illustrating a ground pattern of the antenna device according to the embodiment shown in FIGS. 8(a) and 8(b).
Figure 10:
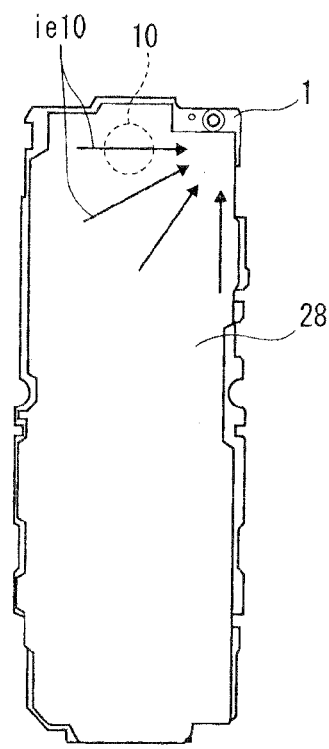
FIG. 10(a) is a diagram illustrating the flow of a ground current corresponding to a tabular inverted F antenna.
FIG. 10(b) is a diagram illustrating the flow of a ground current corresponding to an inverted F antenna.
Figure 10:
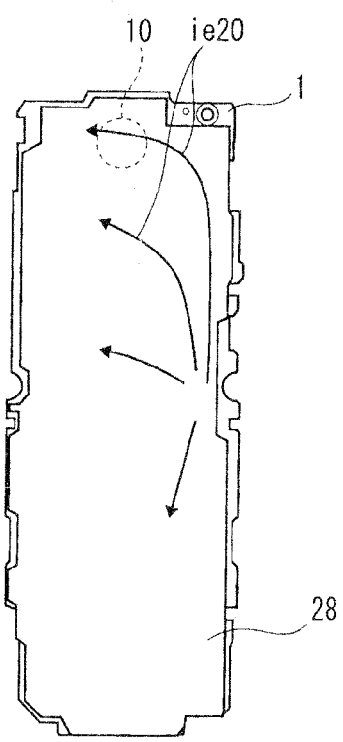

FIG. 9 is a rear view of the printed circuit board 1. The ground pattern 28 is provided on the rear surface of the printed circuit board 1. An example in which the ground pattern 28 is provided on the front surface of the board is shown, but the ground pattern 28 may be formed in an inner layer of the printed circuit board 1. For example, the printed circuit board 1 may form a multi-layer board, and a certain layer thereof may correspond to a ground pattern. Further, the ground pattern 28 may be formed corresponding to plural layers.

FIGS. 10(a) and 10(b) are schematic diagrams of the ground pattern 28 in which a ground current flows. When a transmission signal is transmitted from a transceiver circuit or when a reception signal is received therefrom, the ground current flows in the ground pattern 28 shown in FIGS. 10(a) and 10(b). A ground current ie10 corresponding to an antenna current of a tabular inverted F antenna 11 flows in the ground pattern 28 as shown in FIG. 10(a). The ground current ie10 is an electric current that is input to the tabular inverted F antenna 11 from the ground pattern 28 through the ground part 12 or is output to the ground pattern 28 from the tabular inverted F antenna 11 through the ground part 12.

On the other hand, a ground current ie20 corresponding to an antenna current of the inverted F antenna 18 flows in the ground pattern 28 as shown in FIG. 10(b). The ground current ie20 is an electric current that is input to the tabular inverted F antenna 18 from the ground pattern 28 through the ground part 20 or output to the ground pattern 28 from the inverted F antenna 18 through the ground part 20.

The phase shifter 24 controls a phase difference between the ground currents ie10 and ie20 so that the ground currents ie10 and ie20 have components to cancel each other. Specifically, the phase shifter 24 sets the phase difference between the ground current ie10 and the ground current ie20 to 180° so that the ground current ie10 and the ground current ie20 that flow above the speaker 10 or in the vicinity of the speaker 10 cancel each other out. Here, "above the speaker" represents a position that is overlapped with the speaker 10 when seen from above the plane of FIGS. 10(a) and 10(b). Here, the ground currents ie10 and ie20 flow in approximately opposite directions above the speaker 10 or in the vicinity of the speaker 10 as shown in FIGS. 10(a) and 10(b). Further, the power distributor 22 adjusts the distribution ratio of electric power transmitted from the transceiver circuit 4 to set the ground current ie10 and the ground current ie20 that flow in the vicinity of the speaker 10 to have the same amplitude.

Consequently, the ground current ie10 and the ground current ie20 that flow above the speaker 10 and in the vicinity of the speaker 10 cancel each other out. Thus, it is possible to reduce the SAR, and even when a user uses a hearing aid, it is possible to reduce the electromagnetic field strength in the vicinity of the speaker 10, to reduce electromagnetic wave interference to the hearing aid.

Hereinbefore, a case where the phase shifter 24 sets the phase difference between the ground current ie10 and the ground current ie20 to 180° is described, but the phase difference should not necessarily be set to 180°. That is, it is possible to show the effect of the invention, as long as the phase difference is out of 90°, since the canceling components are present.

Further, as the distribution ratio of the transmitted power, an example in which the ground current ie10 and the ground current ie20 are set to have the same amplitude is shown, but the ground currents ie10 and ie20 do not necessarily have to be completely the same. An optimal distribution ratio may be set according to the phase difference.

Figure 12:
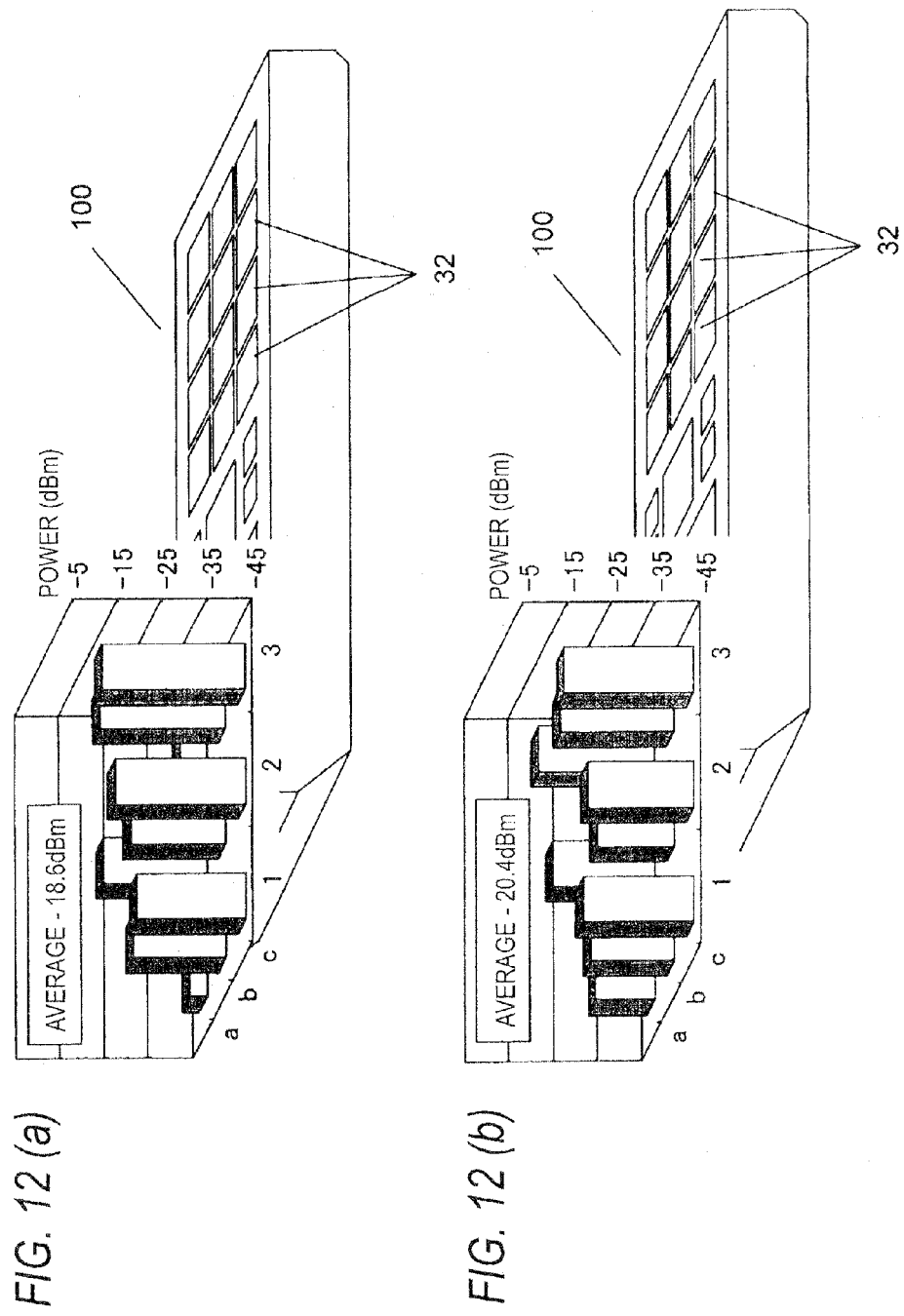
FIG. 12(a) is a diagram illustrating a measurement result of electric field strength distribution of a mobile phone mounted with only the tabular inverted F antenna.
FIG. 12(b) is a diagram illustrating a measurement result of electric field strength distribution of a mobile phone mounted with the tabular inverted F antenna and the inverted F antenna.
Figure 13:
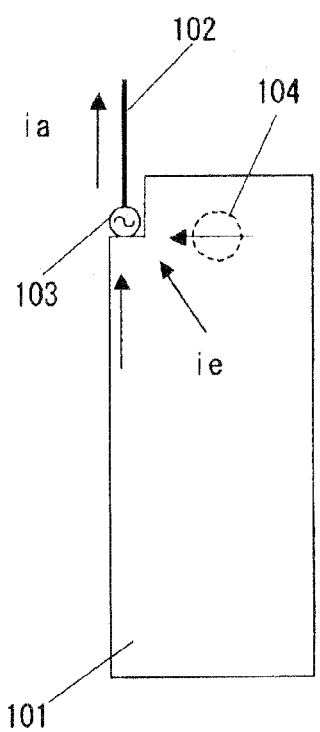
FIGS. 13(a) and 13(b) are diagrams illustrating an antenna device of a mobile phone in the related art.
Figure 13:
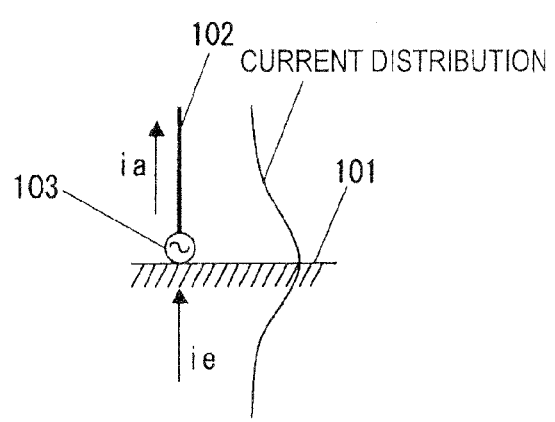

FIGS. 12(a) and 12(b) show measurement results of power distribution in the vicinity of the speaker 10, in a GSM (registered trademark) mobile phone 100 in which the antenna device shown in FIGS. 8(a) and 8(b) is mounted inside a casing. On the side of an operation surface of the casing, a display 33, a keypad 32 and the speaker 10 are provided.

Figure 11:
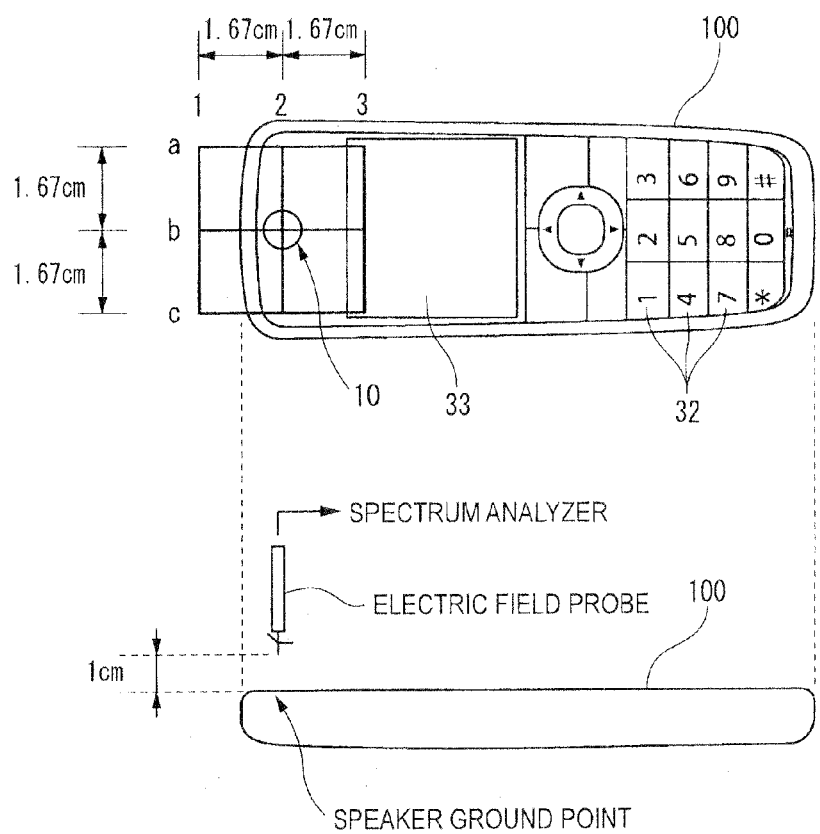
FIG. 11 is a diagram illustrating a power distribution measuring system.

FIG. 11 shows a measuring system. In FIG. 11, the speaker 10 is shown, and respective coordinates that are spaced ±1.67 cm in length and width around the speaker 10 are shown using reference signs a, b, c, 1, 2 and 3. The coordinates of the speaker 10 correspond to (b, 2). A direction of a→b→c is perpendicular to a direction of 1→2→3.

The GSM (registered trademark) mobile phone 100 receives an electric field at a point that is separated 1 cm from the front surface of the GSM (registered trademark) mobile phone 100 by an electric field probe, and measures its level using a spectrum analyzer. The GSM (registered trademark) mobile phone 100 is set to be in a state where a base station simulator communicates with the other person. The used spectrum analyzer is R3671 of Advantest Corporation, in which a resolution band width (RBW) and a video band width (VBW) are set to 1 MHz. The electric field probe employs a probe obtained by processing a coaxial cable (semi-rigid cable), and has a tip end shape in which conductors that respectively extend in triaxial directions of x, y and z by 3 mm are connected to a tip where a central conductor protrudes by about 2 mm. This is a structure for picking up electric field components in the triaxial directions.

FIGS. 12(a) and 12(b) show the measurement results, in which a measured value at each measuring point when the transmitted power of the GSM (registered trademark) 100 is 30 dBm at 700 ch at a band of 1800 M is shown. Specifically, Table 1 and a graph (average value) in FIG. 12(a) show measurement results of the GSM (registered trademark) mobile phone 100 mounted with the only tabular inverted F antenna 11, and Table 2 and a graph (average value) in FIG. 12(b) show measurement results of the GSM (registered trademark) mobile phone 100 mounted with both of the tabular inverted F antenna 11 and the inverted F antenna 18.

Table 1 and Table 2 show power levels (dBm) in the respective coordinates, and details thereof will be described as follows. An average value of the power levels in the respective coordinates in the case of Table 1 is −18.6 dBm, and an average value of the power levels in the respective coordinates in the case of Table 2 is −20.4 dBm.

TABLE 1

|   | 1 | 2 | 3 |
|---|---|---|---|
| a | −41.2 | −22 | −39.3 |
| b | −24.2 | −23.6 | −16.8 |
| c | −20.5 | −15.7 | −12.8 |

(dBm)

TABLE 2

|   | 1 | 2 | 3 |
|---|---|---|---|
| a | −31.6 | −22 | −18.8 |
| b | −26 | −27.5 | −19.2 |
| c | −19.8 | −21 | −15.6 |

(dBm)

By comparing Table 1 and FIG. 12(a) with Table 2 and FIG. 12(b), it can be understood that the level (power level) of the speaker 10 and the average level of the vicinity including the speaker 10 are decreased and the electromagnetic field strength in the vicinity of the speaker 10 is reduced.

Hereinbefore, an example of the mobile phone is described, but the invention may be applied to a wireless communication apparatus such as an extension of a cordless telephone or a tablet terminal.

In the above described embodiments, two antennas are used, but the invention may be applied to three or more antennas.

A first antenna device according to the present embodiment is an antenna device having a plurality of antennas that includes a first antenna that includes a first ground terminal, a second antenna that includes a second ground terminal, a ground conductor to which the first antenna is connected through the first ground terminal and the second antenna is connected through the second ground terminal, and a phase shifter that controls a phase difference between a first current that is input to the first antenna from the ground conductor through the first ground terminal or is output to the ground conductor from the first antenna through the first ground terminal and a second current that is input to the second antenna from the ground conductor through the second ground terminal or is output to the ground conductor from the second antenna through the second ground terminal. Here, the phase shifter controls the phase difference between the first current and the second current so that the first current and the second current have components to cancel each other out.

According to this configuration, since the first current and the second current cancel each other out on the ground conductor, it is possible to efficiently reduce the electromagnetic field strength according to the electric currents that flow in the first antenna and the second antenna.

A second antenna device according to the present embodiment further includes a printed circuit board having a first surface, and a second surface that is a rear surface of the first surface. Here, the first antenna and the second antenna are provided on the first surface, and the ground conductor is provided on the second surface.

According to this configuration, since the ground conductor where the first current and the second current cancel each other out is provided on the surface where the first antenna and the second antenna are not present, it is possible to enlarge a space of the ground conductor, and to efficiently cancel the first current and the second current.

In a third antenna device according to the present embodiment, the ground conductor is a ground pattern that covers the second surface.

According to this configuration, since the ground conductor may cover the entire second surface as the ground pattern, it is possible to more efficiently cancel the first current and the second current.

In a fourth antenna device according to the present embodiment, the phase shifter controls the first current and the second current so that the phase difference therebetween is about 180°.

According to this configuration, it is possible to increase the canceling components of the first current and the second current as large as possible, and thus, it is possible to more efficiently reduce the electromagnetic field strength according to the electric currents that flow in the first antenna and the second antenna.

A fifth antenna device according to the present embodiment further includes a power distributor that approximately equally distributes electric power of electric current that flows in the first antenna and electric power of electric current that flows in the second antenna.

According to this configuration, it is possible to increase the canceling components of the first current and the second current as large as possible, and thus, it is possible to more efficiently reduce the electromagnetic field strength according to the electric currents that flow in the first antenna and the second antenna.

In a sixth antenna apparatus according to the present embodiment, the first antenna uses a first frequency corresponding to the first current, and the second antenna uses a second frequency that is the same as the first frequency, corresponding to the second current.

According to this configuration, since the first current and the second current flow at the same frequency, it is possible to cancel the first current and the second current with high efficiency.

A seventh antenna device according to the present embodiment is an antenna device having a plurality of antennas in a wireless communication apparatus that performs communication in a wireless manner. The antenna device includes a first antenna that includes a first ground terminal, a second antenna that includes a second ground terminal, a ground conductor to which the first antenna is connected through the first ground terminal and the second antenna is connected through the second ground terminal, a phase shifter that is controls a phase difference between a first current that is input to the first antenna from the ground conductor through the first ground terminal or is output to the ground conductor from the first antenna through the first ground terminal and a second current that is input to the second antenna from the ground conductor through the second ground terminal or is output to the ground conductor from the second antenna through the second ground terminal, and a speaker that outputs sound. The phase shifter controls the phase difference between the first current and the second current so that the first current and the second current have components to cancel each other out, on the speaker, or in the vicinity of the speaker.

According to this configuration, it is possible to increase the canceling components of the first current and the second current as large as possible, and thus, it is possible to more efficiently reduce the electromagnetic field strength according to the electric currents that flow in the first antenna and the second antenna. Thus, it is possible to suppress the influence of the electromagnetic field strength on a speaker.

Although the invention is described in detail with reference to the specific embodiment, it is obvious to those skilled in the art that various changes or modifications may be made in a range without departing from the spirit and scope of the invention.

This application is based on and claims priority from Japanese Patent Application No. 2011-013622 filed Jan. 26, 2011, the content of which is incorporated herein for reference.

INDUSTRIAL APPLICABILITY

The invention is useful for an antenna device that is mounted in a portable wireless terminal such as a mobile phone, a wireless communication apparatus, and the like, capable of reducing the electromagnetic field strength in the vicinity of a head part of a human body.

REFERENCE SIGNS LIST

1 PRINTED CIRCUIT BOARD
2 INVERTED L ANTENNA
3 INVERTED L ANTENNA
4 TRANSCEIVER CIRCUIT
5 POWER DISTRIBUTOR
6 MICRO-STRIP LINE
7 PHASE SHIFTER
8 MICRO-STRIP LINE
9 MICRO-STRIP LINE
10 SPEAKER
11 TABULAR INVERTED F ANTENNA
12 GROUND PART OF TABULAR INVERTED F ANTENNA
13 POWER SUPPLY PART OF TABULAR INVERTED F ANTENNA
14 INVERTED L ANTENNA
15 BAND-REJECT FILTER
16 CASING
17 KEYPAD
18 INVERTED F ANTENNA
19 POWER SUPPLY PART OF INVERTED F ANTENNA
20 GROUND PART OF INVERTED F ANTENNA
21 TRANSCEIVER MODULE
22 POWER DISTRIBUTOR
23 BAND-REJECT FILTER
24 PHASE SHIFTER
25 MICRO-STRIP LINE
26 MICRO-STRIP LINE
27 MICRO-STRIP LINE
28 GROUND PATTERN
100 GSM (REGISTERED TRADEMARK) MOBILE PHONE

The invention claimed is:
1. An antenna device having a plurality of antennas, comprising:
   a first antenna that includes a first ground terminal;
   a second antenna that includes a second ground terminal;
   a ground conductor to which the first antenna is connected through the first ground terminal and the second antenna is connected through the second ground terminal; and
   a phase shifter that controls a phase difference between a first current that is input to the first antenna from the ground conductor through the first ground terminal or is output to the ground conductor from the first antenna through the first ground terminal and a second current that is input to the second antenna from the ground conductor through the second ground terminal or is output to the ground conductor from the second antenna through the second ground terminal,
   wherein the phase shifter controls the phase difference between the first current and the second current so that the first current and the second current have components to cancel each other.

2. The antenna device according to claim 1, further comprising:
   a printed circuit board having a first surface and a second surface that is a rear surface of the first surface,
   wherein the first antenna and the second antenna are provided on the first surface, and wherein the ground conductor is provided on the second surface.

3. The antenna device according to claim 2, wherein the ground conductor is a ground pattern that covers the second surface.

4. The antenna device according to claim 1, wherein the phase shifter controls the first current and the second current so that the phase difference therebetween is about 180°.

5. The antenna device according to claim 1, further comprising:
a power distributor that approximately equally distributes electric power of electric current that flows in the first antenna and electric power of electric current that flows in the second antenna.

6. The antenna device according to claim 1, wherein the first antenna uses a first frequency corresponding to the first current, and
wherein the second antenna uses a second frequency that is the same as the first frequency, corresponding to the second current.

7. An antenna device having a plurality of antennas, comprising:
a first antenna that includes a first ground terminal;
a second antenna that includes a second ground terminal and is smaller in size than the first antenna;
a ground conductor to which the first antenna is connected through the first ground terminal and the second antenna is connected through the second ground terminal; and
a phase shifter that controls a phase difference between a first current that is input to the first antenna from the ground conductor through the first ground terminal or is output to the ground conductor from the first antenna through the first ground terminal and a second current that is input to the second antenna from the ground conductor through the second ground terminal or is output to the ground conductor from the second antenna through the second ground terminal,
wherein the phase shifter controls the phase difference between the first current and the second current so that the second current cancels a part of the first current in a desired area.

8. The antenna device according to claim 7, wherein the first antenna and the second antenna are arranged so that the first current and the second current flow outside the area.

9. The antenna device according to claim 7, further comprising:
a printed circuit board having a first surface and a second surface that is a rear surface of the first surface,
wherein the first antenna and the second antenna are provided on the first surface, and
wherein the ground conductor is provided on the second surface.

10. The antenna device according to claim 9, wherein the ground conductor is a ground pattern that covers the second surface.

11. The antenna device according to claim 7, wherein the phase shifter controls the first current and the second current so that the phase difference therebetween is about 180°.

12. The antenna device according to claim 7, further comprising:
a power distributor that approximately equally distributes electric power of electric current that flows in the first antenna and electric power of electric current that flows in the second antenna.

13. The antenna device according to claim 7, wherein the first antenna uses a first frequency corresponding to the first current, and
wherein the second antenna uses a second frequency that is the same as the first frequency, corresponding to the second current.

14. A wireless communication apparatus that performs communication in a wireless manner, comprising:
a first antenna that includes a first ground terminal;
a second antenna that includes a second ground terminal;
a ground conductor to which the first antenna is connected through the first ground terminal and the second antenna is connected through the second ground terminal;
a phase shifter that controls a phase difference between a first current that is input to the first antenna from the ground conductor through the first ground terminal or is output to the ground conductor from the first antenna through the first ground terminal and a second current that is input to the second antenna from the ground conductor through the second ground terminal or is output to the ground conductor from the second antenna through the second ground terminal; and
a speaker that outputs sound,
wherein the phase shifter controls the phase difference between the first current and the second current so that the first current and the second current have components to cancel each other, on the speaker or in the vicinity of the speaker, and
wherein the first current and the second current flow outside the area.

15. The wireless communication apparatus according to claim 14, wherein the first antenna is larger in size than the second antenna.

16. The wireless communication apparatus according to claim 14, further comprising:
a printed circuit board having a first surface and a second surface that is a rear surface of the first surface,
wherein the first antenna and the second antenna are provided on the first surface, and
wherein the ground conductor is provided on the second surface.

17. The wireless communication apparatus according to claim 16, wherein the ground conductor is a ground pattern that covers the second surface.

18. The wireless communication apparatus according to claim 14, wherein the phase shifter controls the first current and the second current so that the phase difference therebetween is about 180°.

19. The wireless communication apparatus according to claim 14, further comprising:
a power distributor that approximately equally distributes electric power of electric current that flows in the first antenna and electric power of electric current that flows in the second antenna.

20. The wireless communication apparatus according to claim 14, wherein the first antenna uses a first frequency corresponding to the first current, and
wherein the second antenna uses a second frequency that is the same as the first frequency, corresponding to the second current.

* * * * *